_US007536198B1_

United States Patent
Wu et al.

(10) Patent No.: US 7,536,198 B1
(45) Date of Patent: May 19, 2009

(54) SYSTEM AND METHOD FOR MULTIPLE INPUT MULTIPLE OUTPUT WIRELESS TRANSMISSION

(75) Inventors: Jianming Wu, Kanata (CA); Wen Tong, Ottawa (CA); Mo-Han Fong, L'Orignal (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 842 days.

(21) Appl. No.: 10/400,528

(22) Filed: Mar. 28, 2003

(51) Int. Cl.
H04B 7/216 (2006.01)
H04B 1/04 (2006.01)
H04B 7/08 (2006.01)

(52) U.S. Cl. .................. 455/522; 370/335; 450/103; 455/132

(58) Field of Classification Search .................. None
See application file for complete search history.

(56) References Cited

U.S. PATENT DOCUMENTS

| | | | | |
|---|---|---|---|---|
| 5,640,386 | A * | 6/1997 | Wiedeman | 370/320 |
| 5,710,784 | A * | 1/1998 | Kindred et al. | 375/262 |
| 5,903,554 | A * | 5/1999 | Saints | 370/342 |
| 6,094,428 | A * | 7/2000 | Bruckert et al. | 370/335 |
| 6,266,528 | B1 * | 7/2001 | Farzaneh | 455/423 |
| 2002/0106995 | A1 * | 8/2002 | Callaway, Jr. | 455/101 |
| 2002/0115473 | A1 * | 8/2002 | Hwang et al. | 455/562 |
| 2002/0183066 | A1 * | 12/2002 | Pankaj | 455/453 |
| 2003/0095529 | A1 * | 5/2003 | Petre et al. | 370/342 |
| 2003/0165183 | A1 * | 9/2003 | Ketchum | 375/146 |
| 2004/0082356 | A1 * | 4/2004 | Walton et al. | 455/522 |

OTHER PUBLICATIONS

Chung, Seong Tack; Lozano, Angel; Huang, Howard C.; Approaching Eigenmode Blast Channels Capacity Using V-Blast With Rate and Power Feedback; IEEE; 2001; pp. 915-919.
Kogiantis, Achilles; Sharma, Naresh; MIMO Architecture Proposal for the F-PDCH; Dec. 6, 2001; pp. 1-7.
LG Electronics; Lucent Technologies; Qualcomm Incorporated; LSI Logic; Nortel Networks; Samsung Electronics; Updated Joint Framework Physical Layer Proposal for 1xEV-DV; Aug. 20, 2001; pp.
WGS Evaluation AHG; 1xEV-DV Evaluation Methodology-Addendum (V6); Jul. 25, 2001; pp. 1-89.

* cited by examiner

*Primary Examiner*—Nick Corsaro
*Assistant Examiner*—Joel Ajayi
(74) *Attorney, Agent, or Firm*—Winthrow & Terranova, P.L.L.C.

(57) ABSTRACT

Systems and methods for MIMO wireless transmission are provided. At the transmitter, a plurality of encoded packets are modulated, and the symbols are divided between several transmit antennas. The transmitter spreads some of the symbols of each packet using a respective subset of an available Walsh code space. A given transmit antenna then transmits part of each packet spread by the respective subset. In some implementations, this achieves the benefits of the PARC system, and at the same time achieves part of the benefits of the STTD system. Advantageously, only a single reverse link control channel is required if adaptive coding and modulation is to be performed.

15 Claims, 8 Drawing Sheets

SYSTEM AND METHOD FOR MULTIPLE INPUT MULTIPLE OUTPUT WIRELESS TRANSMISSION

FIELD OF THE INVENTION

The invention relates to systems and methods for multiple input multiple output wireless transmission.

BACKGROUND OF THE INVENTION

To increase cellular system capacity, one approach that shows promise for substantial capacity enhancement is multiple input and multiple output (MIMO) transmission and reception based on multiple transmit and multiple receive antennas. This has been suggested for use on forward link channels such as the forward-packet-data channel (F-PDCH) in 1xEV-DV [1,2]. To further increase system capacity, Lucent proposed a 2×2 MIMO architecture based on the per-antenna-rate-control (PARC) principle [3]. This scheme has advantages in terms of average high data rates achieved compared to single stream transmission schemes such as those used with minimum-mean square error (MMSE) based dual receive diversity mobile station (MS), phase sweeping transmit diversity (PSTD) and space-time transmit diversity (STTD/STS). One of the main drawbacks with PARC, however, is the high residual frame error rate (FER) compared with the simple dual-receive diversity MS. Thus, it requires a large number of retransmissions to complete a data transmission, particularly in high velocity environments.

STTD is an open loop technique in which the symbols are modulated using the technique of space-time block coding described in [4]. The STTD transmitter and STTD receiver are illustrated in FIG. 1. FIG. 1 shows two symbols $S_1$, $S_2$ entering an STTD encoder 10. This produces at its output a STTD signal to be transmitted over to transmit antennas 12,14. During the first transmit period, $w_1 S_1$ is transmitted on the first antenna and $-w_2 S_2^*$ is transmitted on the second antenna 14. In the following transmit period, $w_1 S_2$ is transmitted on the first antenna 12, and $w_2 S_1^*$ is transmitted on the second antenna 14. It can be seen that the same information is transmitted twice, both during different times and on different antennas. This is transmitted to receive antennas 16 and 18. There is a respective channel between each of the transmit antennas 12,14 and each of the receive antennas 16,18. The four channels are shown as $h_{11}$, $h_{12}$, $h_{21}$, and $h_{22}$. The signals received by the two receive antennas 16,18 are passed to an STTD decoder 20 which recovers received versions $S_2^-, S_1^-$ of the transmitted symbols $S_1, S_2$. In FIG. 1, the expression $w_1 S_1$ represents a Walsh space multiplied by a transmit packet. More particularly, if a Walsh space is available consisting of M Walsh codes is available, this Walsh space is divided among the two antennas, and the contents of the packet divided into segments for transmission using each Walsh code. Thus, in a 16 Walsh code Walsh space, 8 Walsh codes would be transmitted on each transmit antenna, and the transmit packet would be divided into 8 segments with one segment being transmitted using each Walsh code. Each symbol might be an MPSK symbol for example or any other suitable modulation symbol. However, for space-time encoding it is necessary that the symbols lend themselves to complex conjugation.

The STTD scheme is particularly simple. It implements the space-time block code (2×2 code matrices). The orthogonality property of the code matrices allows the symbols from the two transmit antennas to be separated at the receiver. Thus, it may achieve a significant coding gain on space and time as opposed to other diversity schemes such as orthogonal transmit diversity (OTD).

The PARC MIMO system is illustrated in FIG. 2. In this example, the data sequence can be seen to be demultiplexed into two separate streams 30,32. Each stream is assigned an independent modulation/coding/rate. Each of the two streams is used in BLAST encoder 31 to generate a separate Walsh code spread signal that is transmitted from only one of the antennas. In this case, the entire available Walsh space is assigned on both antennas, and as such there is no Walsh code splitting. This is illustrated by showing each symbol being multiplied by the combination of $w_1 + w_2$. This means that the packet is divided into a number of segments equal to the number of Walsh codes and an equal portion of the packet is transmitted using each Walsh code. For example, if there are 16 Walsh codes in the available Walsh space, the packet would be divided into 16 portions and each portion transmitted using a respective Walsh code. It can be seen that there is no space diversity at the transmitter or time diversity at the transmitter. However, at the receiver there is space diversity since the signal is received at two different antennas.

This design is capable of increasing the system capacity by a factor of two as opposed to 1xEV-DV system.

It should be noted that the transmit encoder packets may belong to either the same user or different users, resulting in different requirements for control signaling. In case of the same user served by two transmit antennas, this requires all encoder packets to occupy the same number of transmission slots so that the transmission for the packets can be always started at the same time. This requires two feedback signal for transmit packet length but requires two feedback signals for packet rate control due to the closed loop MIMO scheme. In case of the different users served by different transmit antennas, this does not require encoder packets to occupy the same number of transmission slots, but requires twice the feedback information for transmit packet length.

Even when the encoder packets belong to the same user, this system still requires two feedback channels (packet data control channel, PDCCH). This is because the channel feedback signal includes the number of packets, modulation and code rate information (in this case, the modulation and code rate, in general, are not the same on different antenna due to the difference reported CIR), and it is not possible to employ only one channel to complete such information feedback.

SUMMARY OF THE INVENTION

Systems and methods for MIMO wireless transmission are provided. At the transmitter, a plurality of encoded packets are modulated, and the symbols are divided between several transmit antennas. The transmitter spreads some of the symbols of each packet using a respective subset of an available Walsh code space. A given transmit antenna then transmits part of each packet spread by the respective subset. In some implementations, this achieves the benefits of the PARC system, and at the same time achieves part of the benefits of the STTD system. Advantageously, only a single reverse link control channel is required if adaptive coding and modulation is to be performed.

According to one broad aspect, the invention provides a method of transmitting a first set of modulation symbols of a first encoded packet comprising: spreading a first subset of the first set of modulation symbols using a first subset of an orthogonal code set to generate a first spread signal, and transmitting the first spread signal on a first antenna; spreading a second subset of the first set of modulation symbols using a second subset of the orthogonal code set to generate a second spread signal and transmitting the second spread signal on a second antenna.

In some embodiments, the first subset of the orthogonal code set is distinct from the second subset of the orthogonal code set.

In some embodiments, the method further comprises transmitting a second set of modulation symbols of a second encoded packet by: spreading a first subset of the second set of modulation symbols using the first subset of the orthogonal code set to further generate said second spread signal; spreading a second subset of the second set of modulation symbols using the second subset of the orthogonal code set to further generate said first spread signal.

In some embodiments, the orthogonal code set comprises a complete or incomplete set of Walsh codes.

In some embodiments, the method further comprises: performing a first encoding of a first raw information stream to generate the first encoded packet and performing a first modulation of the first encoded packet to generate the first set of modulation symbols.

In some embodiments, the method further comprises: receiving channel quality information over a first reverse link control channel, the channel quality information being generated by a receiver of the first encoded packet; adaptively controlling the first encoding and the first modulation as a function of the first channel quality information received over the reverse link control channel.

In some embodiments, the channel quality information comprises an average carrier to interference ratio experienced across multiple antennas at a receiver of the first encoded packet.

In some embodiments, the first encoded packet and the second encoded packet belong to a single user, the method further comprising: transmitting a single forward link control channel identifying one or more of number of slots, code rate and modulation type.

In some embodiments, the first encoded packet and the second encoded packet each belong to a different user, the method further comprising: for each different user, transmitting a respective forward link control channel identifying one or more of number of slots, transmission rate, code rate/type and modulation type.

In some embodiments, the first encoded packet and the second encoded packet are for a single user, the method further comprising: performing encoding of a raw information stream to generate the first encoded packet and the second encoded packet and performing modulation of the first encoded packet and the second encoded packet to generate the first set of modulation symbols and the second set of modulation symbols.

In some embodiments, the method further comprises: receiving channel quality information over a reverse link control channel from a receiver of the first encoded packet and the second encoded packet; adaptively controlling the encoding and the modulation as a function of the channel quality information received over the reverse link control channel.

In some embodiments, the first encoded packet is for a first user and the second encoded packet is for a second user, the method further comprising: performing a first encoding of first raw information stream to generate the first encoded packet and performing a first modulation of the first encoded packet to generate the first set of modulation symbols; performing a second encoding of a second raw information stream to generate the second encoded packet and performing a second modulation of the second encoded packet to generate the second set of modulation symbols.

In some embodiments, the method further comprises: receiving channel quality information over a first reverse link control channel from a receiver of the first encoded packet; receiving channel quality information over a second reverse link control channel from a receiver of the second encoded packet; adaptively controlling the first encoding and the first modulation as a function of the channel quality information received over the first reverse link control channel; adaptively controlling the second encoding and the second modulation as a function of the channel quality information received over the second reverse link control channel.

In some embodiments, the first reverse quality control channel carries channel quality information comprising an average carrier to interference ratio experienced across multiple antennas at the receiver of the first encoded packet; wherein the second reverse quality control channel carries channel quality information comprising an average carrier to interference ratio experienced across multiple antennas at the receiver of the second encoded packet.

According to another broad aspect, the invention provides a method comprising: for each of a plurality M of transmit antennas where $M \geq 2$, generating a respective spread signal by: spreading a respective subset of each of a plurality M sets of modulation symbols each associated with a respective encoded packet using a respective subset of an orthogonal code set and transmitting the respective spread signal on the transmit antenna, the respective subsets used for the antenna being non-overlapping.

In some embodiments, the method further comprises: for each different receiver to which at least one of said M sets of modulation symbols is to be transmitted: a) receiving a respective channel quality information from the receiver; b) performing adaptive modulation and encoding as a function of the channel quality information; c) transmitting respective forward link control information to the receiver identifying the adaptive modulation and encoding performed.

In some embodiments, the respective subsets used on different transmit antennas for different subsets of the same set of modulation symbols are also non-overlapping.

According to another broad aspect, the invention provides a method of receiving a signal from a transmitter comprising: receiving a signal at each of a plurality of antennas, each signal being a combination of signals generated using a MAT (mix antenna transmission) transmit scheme; performing decoding of the signals to recover at least one packet.

In some embodiments, the method further comprises: generating an average signal quality metric from the signals and transmitting this back to the transmitter.

According to another broad aspect, the invention provides a transmitter for transmitting a first set of modulation symbols of a first encoded packet, the transmitter comprising: a first spreading function adapted to spread a first subset of the first set of modulation symbols using a first subset of an orthogonal code set to generate a first spread signal; a first antenna for transmitting the first spread signal; a second spreading function adapted to spread a second subset of the first set of modulation symbols using a second subset of the orthogonal code set to generate a second spread signal; a second antenna for transmitting the second spread signal.

In some embodiments, the first subset of the orthogonal code set is distinct from the second subset of the orthogonal code set.

In some embodiments, the transmitter further adapts to transmit a second set of modulation symbols of a second encoded packet wherein: the second spreading function is further adapted to spread a first subset of the second set of modulation symbols using the first subset of the orthogonal code set to further generate said second spread signal; the first spreading function is further adapted to spread a second subset of the second set of modulation symbols using the first subset of the orthogonal code set to further generate said first spread signal.

In some embodiments, the orthogonal code set comprises a complete or incomplete set of Walsh codes.

In some embodiments, the transmitter further comprises: a first encoder adapted to perform a first encoding of a first raw information stream to generate the first encoded packet; a first modulator adapted to perform a first modulation of the first encoded packet to generate the first set of modulation symbols.

In some embodiments, the transmitter further comprises: an input for receiving channel quality information over a first reverse link control channel, the channel quality information being generated by a receiver of the first encoded packet; an adaptive controller for adaptively controlling the first encoding and the first modulation as a function of the first channel quality information received over the reverse link control channel.

In some embodiments, the first encoded packet and the second encoded packet belong to a single user, the transmitter being further adapted to transmit a single forward link control channel identifying one or more of number of slots, code rate and modulation type.

In some embodiments, the first encoded packet and the second encoded packet each belong to a different user, the transmitter being further adapted to for each different user, transmit a respective forward link control channel identifying one or more of number of slots, transmission rate, code rate/type and modulation type.

In some embodiments, the first encoded packet and the second encoded packet are for a single user, the transmitter further comprising: an encoder for performing encoding of a raw information stream to generate the first and second encoded packets; a modulator for performing modulation of the first and second encoded packets to generate the first and second sets of modulation symbols.

In some embodiments, the transmitter further comprises: an input for receiving channel quality information over a reverse link control channel from a receiver of the first encoded packet and the second encoded packet; an adaptive controller for adaptively controlling the encoding and the modulation as a function of the channel quality information received over the reverse link control channel.

In some embodiments, the first encoded packet is for a first user and the second encoded packet is for a second user, the transmitter further comprising: a first encoder for performing a first encoding of a first raw information stream to generate the first encoded packet; a first modulator for performing first modulation of the first encoded packet to generate the first set of modulation symbols; a second encoder for performing a second encoding of a second raw information stream to generate the second encoded packet; a second modulator for performing a second modulation of the second encoded packet to generate the second set of modulation symbols.

In some embodiments, the transmitter further comprises: a first input for receiving channel quality information over a first reverse link control channel from a receiver of the first encoded packet; a second input for receiving channel quality information over a second reverse link control channel from a receiver of the second encoded packet; a first adaptive controller for adaptively controlling the first encoding and the first modulation as a function of the channel quality information received over the first reverse link control channel; a second adaptive controller for adaptively controlling the second encoding and the second modulation as a function of the channel quality information received over the second reverse link control channel.

According to another broad aspect, the invention provides a transmitter comprising: M transmit antennas; signal spreading functions which for each of the plurality M of transmit antennas where $M>=2$, generate respective spread signal by: spreading a respective subset of each of a plurality M sets of modulation symbols each associated with a respective encoded packet using a respective subset of an orthogonal code set and transmitting the respective spread signal on the transmit antenna, the respective subsets used for the antenna being non-overlapping.

In some embodiments, the respective subsets used on different transmit antennas for different subsets of the same set of modulation symbols are also non-overlapping.

According to another broad aspect, the invention provides a receiver comprising: a plurality of receive antennas each receiving a signal which is a combination of signals generated using a MAT (mix antenna transmission) transmit scheme; a decoder adapted to perform decoding of the signals to recover at least one of packet.

In some embodiments, the receiver further adapts to generate an average signal quality metric from the signals and transmit this back to the transmitter.

According to another broad aspect, the invention provides a system comprising: a) a transmitter comprising: M transmit antennas; signal spreading functions which for each of the plurality M of transmit antennas where $M>=2$, generate respective spread signal by: spreading a respective subset of each of a plurality M sets of modulation symbols each associated with a respective encoded packet using a respective subset of an orthogonal code set and transmitting the respective spread signal on the transmit antenna, the respective subsets used for the antenna being non-overlapping; b) at least two receivers each comprising at least two receive antennas, each receiver being adapted to perform decoding and modulation of signals received from the transmitter to recover at least one respective packet.

In some embodiments, each receiver is further adapted to generate a signal quality information from signals received by the receiver and to transmit this back to the transmitter; wherein the transmitter further comprises: for each receiver, a channel quality input for receiving channel quality information from the receiver; for each receiver, a respective encoder adapted to perform an encoding of a respective raw information stream to generate a respective encoded packet; for each receiver, a respective modulator adapted to perform a modulation of the respective encoded packet to generate the respective set of modulation symbols; wherein the transmitter adaptively controls the encoding and the modulation performed for each receiver as a function of the channel quality information received from the receiver.

In some embodiments, the transmitter is further adapted to, for each different user, transmit a respective forward link control channel identifying one or more of number of slots, code rate and modulation type.

According to another broad aspect, the invention provides a transmitter for generating a plurality M of spread signals, where $M>=2$, the transmitter comprising: M transmit antennas; for each transmit antenna, means for spreading a respective subset of each of a plurality M sets of modulation symbols each associated with a respective encoded packet using a respective subset of an orthogonal code set; wherein the respective spread signal is transmit on the transmit antenna, with the respective subsets used for the antenna being non-overlapping.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
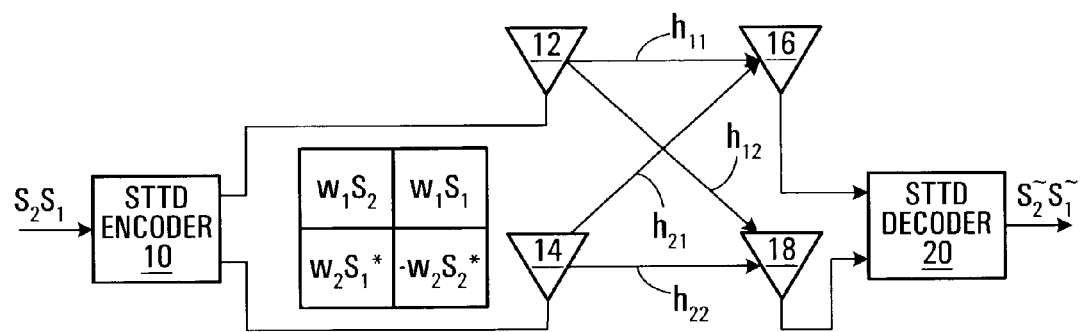
FIG. 1 is a block diagram of a conventional STTD based transmit scheme.
Figure 2:
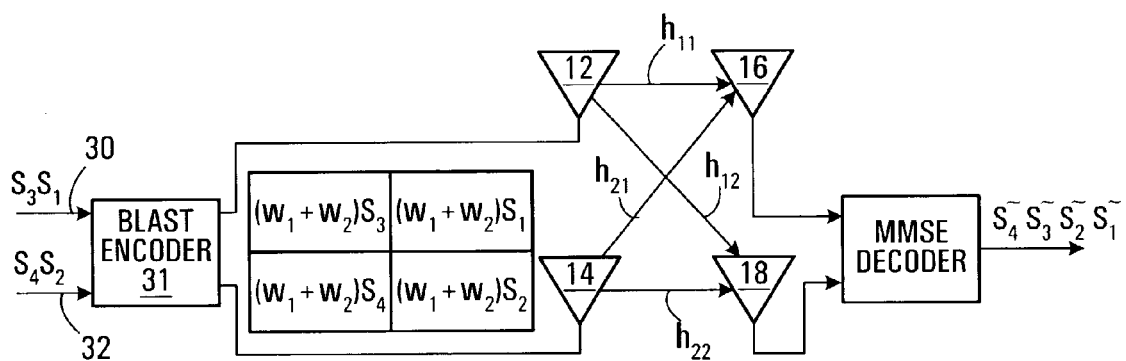
FIG. 2 is a block diagram of a conventional PARC based transmission scheme.
Figure 3:
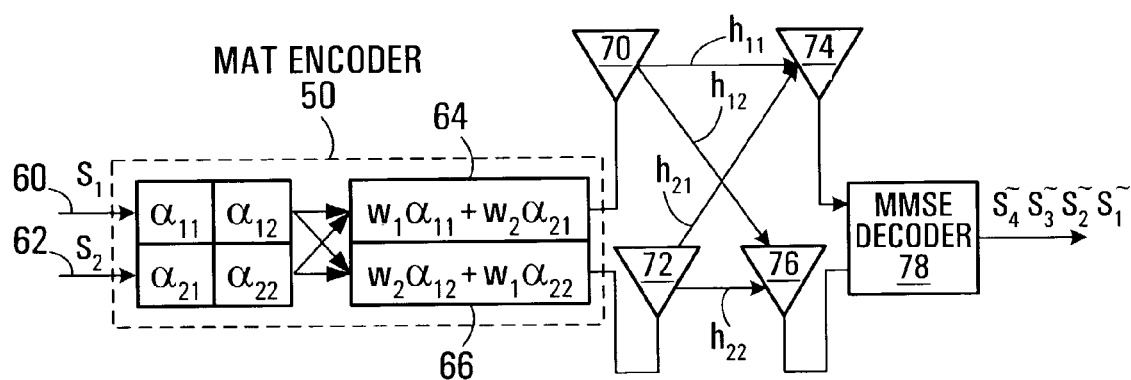
FIG. 3 is a block diagram of a MAT (mix antenna transmission) based scheme provided by an embodiment of the invention.

FIG. 3 shows a simplified example of a mix-antenna transmission (MAT) scheme provided by the invention which is based somewhat on the principles of PARC for MIMO systems. The motivation for this scheme is to increase the efficiency for both transmit antenna diversity and Walsh code reuse. The example is focusing on a two transmit antenna by two receive antenna embodiment. However, as will be described further below this is easily generalized to a generic MIMO application. Furthermore, while a single two receive antenna receiver is shown, multiple receivers of different users can receive the signals sent on the transmit antennas. Each user's signals would experience a different channel for each transmit antenna+receive antenna permutation. At the transmitter, a first input 60 carries a signal $S_1$ which represents a sequence of modulation symbols generated from an encoded packet. Similarly, input 62 carries $S_2$, a sequence of modulation symbols generated from a second encoded packet. The first sequence of encoded symbols $S_1$ is split into two parts $\alpha_{11}$ and $\alpha_{12}$. Similarly, the second set of modulation symbols is split into two parts labelled $\alpha_{21}$ and $\alpha_{22}$. Block 64 represents Walsh code spreading that is applied for the signal to be transmitted on a first transmit antenna 70, and block 66 represents Walsh code spreading which is performed for the signal to be transmitted on the second transmit antenna 72. Half of the first set of modulation symbols, namely $\alpha_{11}$ and half of the second set of modulation symbols, namely $\alpha_{21}$ are processed in Walsh code spreading block 64. Half of the Walsh code space is used to spread all while the other half of the Walsh code space is used to spread $\alpha_{21}$. Similarly, in Walsh code spreading block 66, half of the Walsh code space is used to spread $\alpha_{12}$ while the other half of the Walsh code space is used to spread $\alpha_{22}$. The Walsh code space used to spread all in Walsh code spreading block 64 is different from the Walsh code space used to spread $\alpha_{12}$, the other half of the same set of modulation symbols $S_1$. The two antennas transmit simultaneously, and the receiver is shown also with two antennas 74,76. MMSE decoding is performed to recover the transmitted symbol stream. At the receiver the encoder packet is recovered based on the received signals from two different transmit antennas. This operation results in that the MAT scheme not only preserves the benefits of the previous PARC scheme, but also achieves the additional antenna diversity gain. More generally, any type of decoding can be performed at the receiver at the discretion of the receiver designer. For example, a RAKE receiver design might alternatively be employed.

A much more detailed example will now be described with reference to FIG. 4A. This is another example of a two antenna transmitter. In this example, it is assumed that there are two users to which data is to be transmitted. Each user has a two antenna receiver. Only one user's equipment is shown. A first set of data, 100 consisting of bits $\{b_1,b_2 \ldots\}$ is input to user one encoder 104 which performs encoding with code rate $R_1$. This generates a first encoded packet 105 which is input to user one modulator 108 which performs modulation $M_1$. This might for example be one of 16 QAM, 8PSK or QPSK. The output of the user one modulator 108 is a first set of modulation symbols 109 consisting of symbols $S_1, \ldots, S_N$. Similarly, for a second data stream 102 consisting of bits $\{d_1, d_2 \ldots\}$, this is input to user two encoder 106 which performs encoding with code rate $R_2$. This generates a second encoded packet 107 which is modulated with user two modulator 110 with modulation type $M_2$. The output of user two modulator 110 is a second set of modulation symbols 111 containing symbols $P_1, \ldots, P_N$. The encoding and modulation performed for the first data stream 100 may be different than that performed for the second data stream 102.

The first set of modulation symbols 109 is demultiplexed with demultiplexer 112. This splits the first set of modulation symbols into a first subset 116 designated as $\alpha_{11}$. In the illustrated example, this consists of symbols $S_1, \ldots, S_{N/2-1}$. The demultiplexer 112 produces a second subset 118 designated as $\alpha_{12}$ containing symbols $S_{N/2}, \ldots, S_N$. More generally, any division of the symbols of the first set of modulation symbols 109 between two demultiplexed streams 116,118 can be performed.

Similarly, the second set of modulation symbols 111 is demultiplexed with demultiplexer 114 to generate two outputs 120,122. The first output 120 is designed at $\alpha_{21}$ and contains symbols $P_1, \ldots, P_{N/2-1}$. The second output 122 is designated as $\alpha_{22}$ and contains symbols $P_{N/2}, \ldots, P_N$. $\alpha_{11}$, $\alpha_{12}$, $\alpha_{21}$, $\alpha_{22}$ are analogous to the like identified elements of FIG. 3. Next, part of the modulation symbols of the first set 109, namely $\alpha_{11}$, in combination with part of the modulation symbols of the second set of modulation symbols 111, namely $\alpha_{21}$ are input to a Walsh spreading block 130 for a first transmit antenna 134. Similarly, the rest of the modulation symbols, namely those of $\alpha_{12}$ and $\alpha_{22}$ are input to a second Walsh spreading block 132 connected to the second transmit antenna 136.

For this example, it is assumed that the Walsh space W available for this contains four Walsh codes $w_a, w_b, w_c, w_d$, and that two Walsh sub-spaces are defined according to $w_1=\{w_a,w_b\}$ and $w_2=\{w_c,w_d\}$. This is summarized generally at 140 of FIG. 4A. More generally, the system will have available some number of Walsh codes and typically a sub-set of these Walsh codes would be made available for transmission of these packets. If there are a number $N_{tot}$ of Walsh codes of which $N_{data}$ are used to transmit packets, then a Walsh spreading gain of $N_{tot}$ divided by $N_{data}$ is realized by the Walsh spreading functions.

Referring back to FIG. 4A again, both Walsh spreading functions 130,132 operate on the same Walsh space. Half of the Walsh space, namely $w_1$ is applied to the data of one encoder packet while the other half of the Walsh space, namely $w_2$ is applied to the data of the other encode packet by each Walsh spreading function. This was summarized in FIG. 3 by indicating that the first Walsh spreading function 130 (64 of FIG. 3) is equal to $w_1\alpha_{11}+w_2\alpha_{21}$ while the second Walsh spreader 132 (spreader 66 of FIG. 3) generates $w_2\alpha_{12}+w_1\alpha_{22}$. This is however a short hand way of showing how Walsh codes are applied to symbols. A detailed breakdown of the content of the signal transmitted on the first antenna 134 is summarized in the box 142 of FIG. 4. During the first transmit period, $T_1$, the output on the first antenna 134 is $w_aS_1+w_bS_2+w_cP_1+w_dP_2$. Similar signals are transmitted for each of the transmit periods. It will be necessary to transmit N/4 transmit periods to transmit the entire set of modulation symbols output by the first Walsh spreading function 130. A similar breakdown of the content of the signal transmitted on antenna 136 is indicated at 144.

It can be seen that during a given instant of transmission, the signal transmitted on the first antenna includes content generated from the first set of modulation symbols 109 which in turn was generated from the first encoded packet 105 and the first input data stream 100, and also contains content derived from a second set of modulation symbols 111 which was generated from the second encoded packet 107 which was generated from the second data stream 102. The same is true for the signal transmit on the second antenna 136.

Figure 4A:
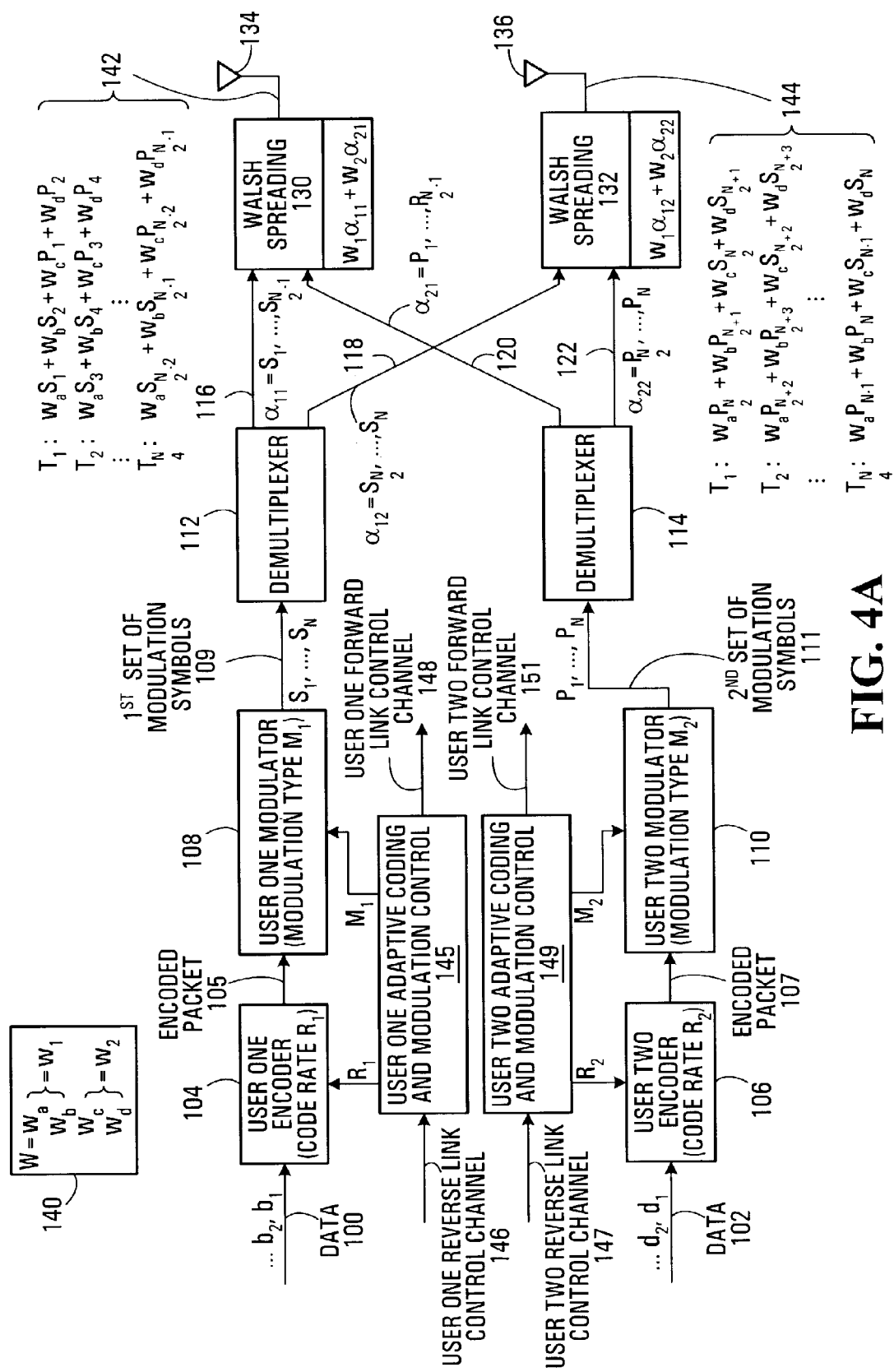
FIG. 4A is a more detailed block diagram of a multi-user MAT based scheme provided by an embodiment of the invention.

Also shown in FIG. 4A is a first adaptive control and modulation control function 145 which would be featured in embodiments having adaptive coding and modulation. This function 145 decides on the coding rate $R_1$ and the modulation type $M_1$ for the first user. The decision is made as a function of a user one reverse link control channel 146. Also shown is a second adaptive coding and modulation control function 149 which does the same for the second user based on user two reverse link control channel 147. In one embodiment of the invention, the reverse link control channels 146, 147 are used by the receivers to convey average C/I information to the transmitter. The control aspect is described in further detail below. Also shown is a user one forward link control channel 148 over which any control information required for user one receiver to decode/receive the transmit information is sent. Similarly a user two forward link control channel 151 is also shown. It is noted that the forward link control channels and the reverse link control channels can be transmitted using any appropriate medium. For example, the forward link control channel might be transmitted on one or more additional Walsh codes.

It is to be understood that FIG. 4A is a very specific implementation. A real implementation might include additional blocks not shown. Furthermore, the number of Walsh codes used, and the manner in which the Walsh codes are divided, and the manner in which the symbols are demultiplexed between the two antennas is specific to this example only.

As discussed above, preferably the rate and modulation type used in the transmitter is adaptively controlled as a function of conditions at the receiver. For this purpose, the reverse link control channels 146,147 are provided. One such channel is used by each receiver to indicate to the base station the channel quality measurements of the best serving sector. The channel quality can be measured in terms of carrier-to-interference ratio (CIR) and may for example be estimated from the received forward-link pilot signal from each sector in the active set. It is noted that for a conventional MIMO system, two such channels are required for each receiver to indicate CIRs for two transmit antennas due to the independent rate control. For the MAT system, however, only one channel per receiver for channel indication is required because only the averaged CIR is to the reported base station. The reported CIR can be averaged over all transmit antennas, given by $$\overline{CIR} = \frac{1}{M}\sum_{m=0}^{M-1} CIR_m$$

where $CIR_m$ denotes the received CIR from the m-th transmit antenna. In order to determine $CIR_m$ the following parameters according to [4] can be defined. Let M and N denote the number of transmit and receive antennas respectively. Let H denote the N×M channel matrix, $h_m$ denote the m-th column of the channel matrix H and $H_m=[h_1 h_2 \ldots h_{m-1} h_{m+1} \ldots h_M]$, i.e., the channel matrix with the m-th column removed. By employing the minimum-mean square error (MMSE) receiver, the received CIR are given by $$CIR_m = h_m^H \cdot \left(H_m H_m^H + \frac{M}{P_m} \cdot I_N\right)^{-1} \cdot h_m$$

where the superscript H denotes conjugate and transpose, $I_N$ is the identity N×N matrix and $P_m$ is the transmit power from the m-th transmit antenna.

According to the reported CIR, the base station determines an appropriate payload. This might include adjusting transmission rate, encoding type/rate, and/or modulation type for example. Many forms of adaptive encoding and modulation are known and can be applied here. The information relative to the payload and the transmission is transmitted through the respective forward link control channel to each user. It is also to be understood that other measures of channel quality can alternatively be employed within the scope of the invention.

Figure 4B:
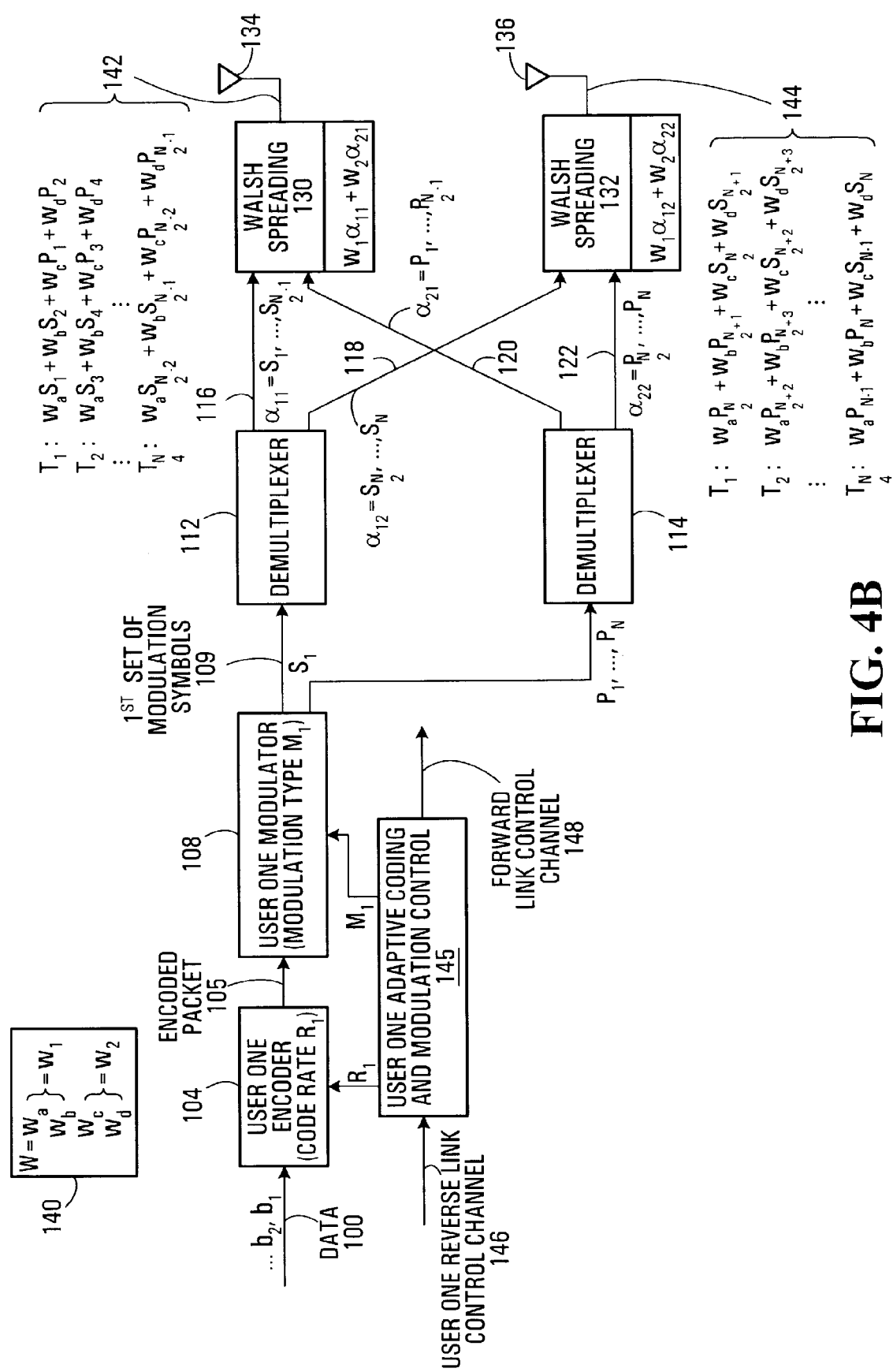
FIG. 4B is a more detailed block diagram of a single-user MAT based scheme provided by an embodiment of the invention.

The single user version of FIG. 4A is shown in FIG. 4B. With this implementation, only a single encoder and modulator are required and these are used to generate two encoded packets and two sets of modulation symbols. These are then demultiplexed and spread between the two antennas as in the two user embodiment of FIG. 4A. In this case, there is only a single reverse link control channel 146 and a single forward link control channel 148.

If it is assumed the same user occupies the same packet data channels, it is straightforward to understand that the PARC requires two forward link control channels while the proposed MAT requires only one channel due to the same payload and transmission rate on different transmit antennas.

The comparison of signaling channels on both links between PARC and MAT is listed in Table 1.

TABLE 1

Comparison of signaling channels between PARC and MAT.

|  | PARC | MAT |
| --- | --- | --- |
| Reverse-Link | 2 reverse link control channels per user | 1 reverse link control channel per user |
| Forward-Link | 2 forward link control channels | 1 or 2 forward link control channels |

To investigate the performances in terms of user throughput, residual FER and PDCCH (packet data control channel) FER, (the PDDCH is an example of a forward link control channel), a system level simulation associated with full buffer FTP traffic model was employed. The simulation is performed to compare the following three schemes: transmit diversity, MIMO PARC, and proposed MAT.

Simulation assumptions and methodologies are mainly based on 1xEV-DV system [1]. A mixed channel model as listed in Table 2 is considered in the system level simulation.

TABLE 2

Channel Models

| Channel Model | # of fingers | Speed (km/h) | Fading | Assignment Probability |
|---|---|---|---|---|
| Model A | 1 | 3 | Jakes | 0.3 |
| Model B | 1 | 10 | Jakes | 0.3 |
| Model C | 1 | 30 | Jakes | 0.2 |
| Model D | 1 | 120 | Jakes | 0.1 |
| Model E | 1 | 0, fD = 1.5 Hz | Rician Factor (K = 10 dB) | 0.1 |

With respect to both PARC and MAT simulations, the following user scheduling methods based on proportional fairness (PF) were considered.

Transmit packets belonging to different users are assigned to different transmit antennas (given a name diff-user in the following discussion). This provides the best performance among the schedulers since the user encoder packets do not need to occupy the same number of slots so that many choices relative to transmission rate and payload for the encoder packet can be taken. In this case, two PDCCH channels are required to indicate the packet pointer.

Transmit packets must belong to the same user and occupy the same number of slots (given a name same-user in the following discussion). This results in some degradation because the determination relative to payload and transmission rate is constrained with the same number of occupying slots. In this case, only one PDCCH channel is required to indicate the packet pointer.

To maintain the PDCCH FER under expected level of $10^{-2}$ in the system level simulations, the margins as used in 1xEV-DV [1] for PDCCH are employed. The specific margin values with respect to channel model and the number of slots are listed in Table 3.

TABLE 3

Power margin f or PDCCH in 1xEV-DV.

| | Channel A | Channel B | Channel C | Channel D | Channel E |
|---|---|---|---|---|---|
| 1 Slot | 2 dB | 4 dB | 11 dB | 16 dB | 1 dB |
| 2 Slots | 1 dB | 1 dB | 6 dB | 3 dB | 1 dB |
| 4 Slots | 1 dB | 1 dB | 1 dB | 1 dB | 1 dB |

Figure 5:
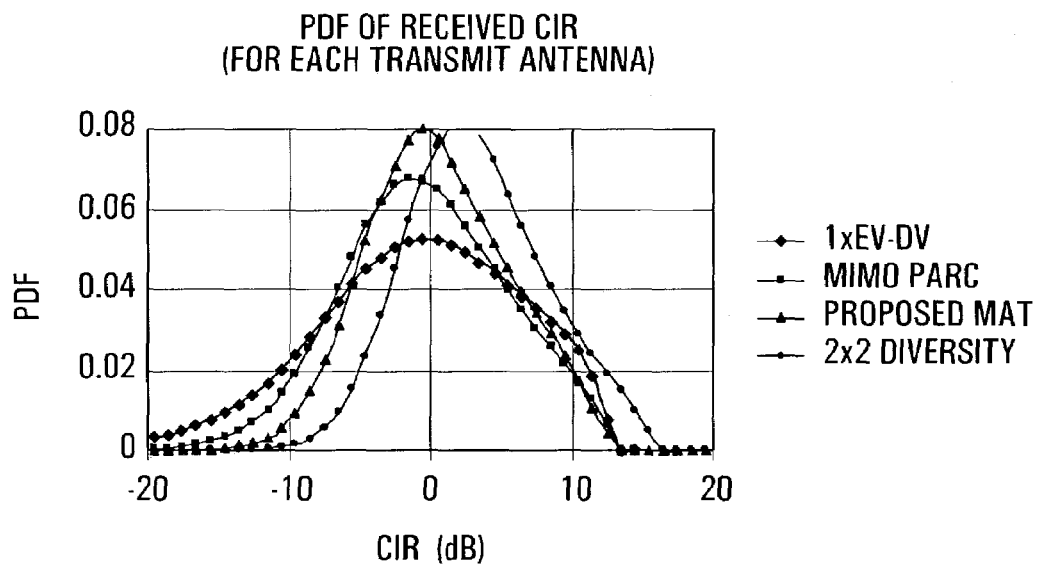
FIGS. 5 through 9 provide simulation results.
Figure 6:
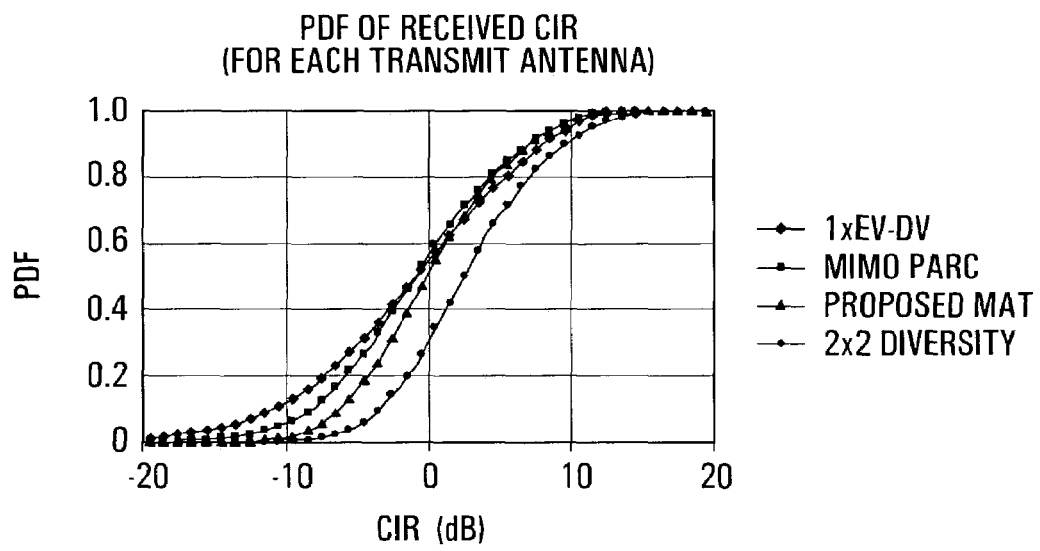

FIG. 5 and FIG. 6 show the CIR distribution for 1xEV-DV, MIMO PARC, 2×2 transmit diversity, and MAT. From the figures, a comparison can be made between them in terms of average CIR, standard deviation, and user coverage.

From the distribution results, it can be seen that 1xEV-DV, MIMO PARC, and MAT generate almost the same average CIR. The reason for this is as follows. Since MIMO PARC and the MAT both employ 2×2 antennas and each transmits half power, the average received power combined at two receive antennas should be same as that in 1xEV-DV. This results in the same average CIR after multiple receive antennas combining. On the other hand, because 2×2 transmit diversity combines all the paths at the receiver, it achieves a 3 dB average CIR gain as opposed to the others.

Moreover, it is found that the MAT approach provides the same standard deviation of received CIR as 2×2 diversity, but it is much smaller than that of 1xEV-DV and MIMO PARC. This is because both MAT and 2×2 diversity offer an additional transmit diversity.

MAT also shows the much better user coverage than 1xEV-DV and MIMO PARC, although it is worse than 2×2 (see the CIR region between −20 and −5 dB).

Figure 7:
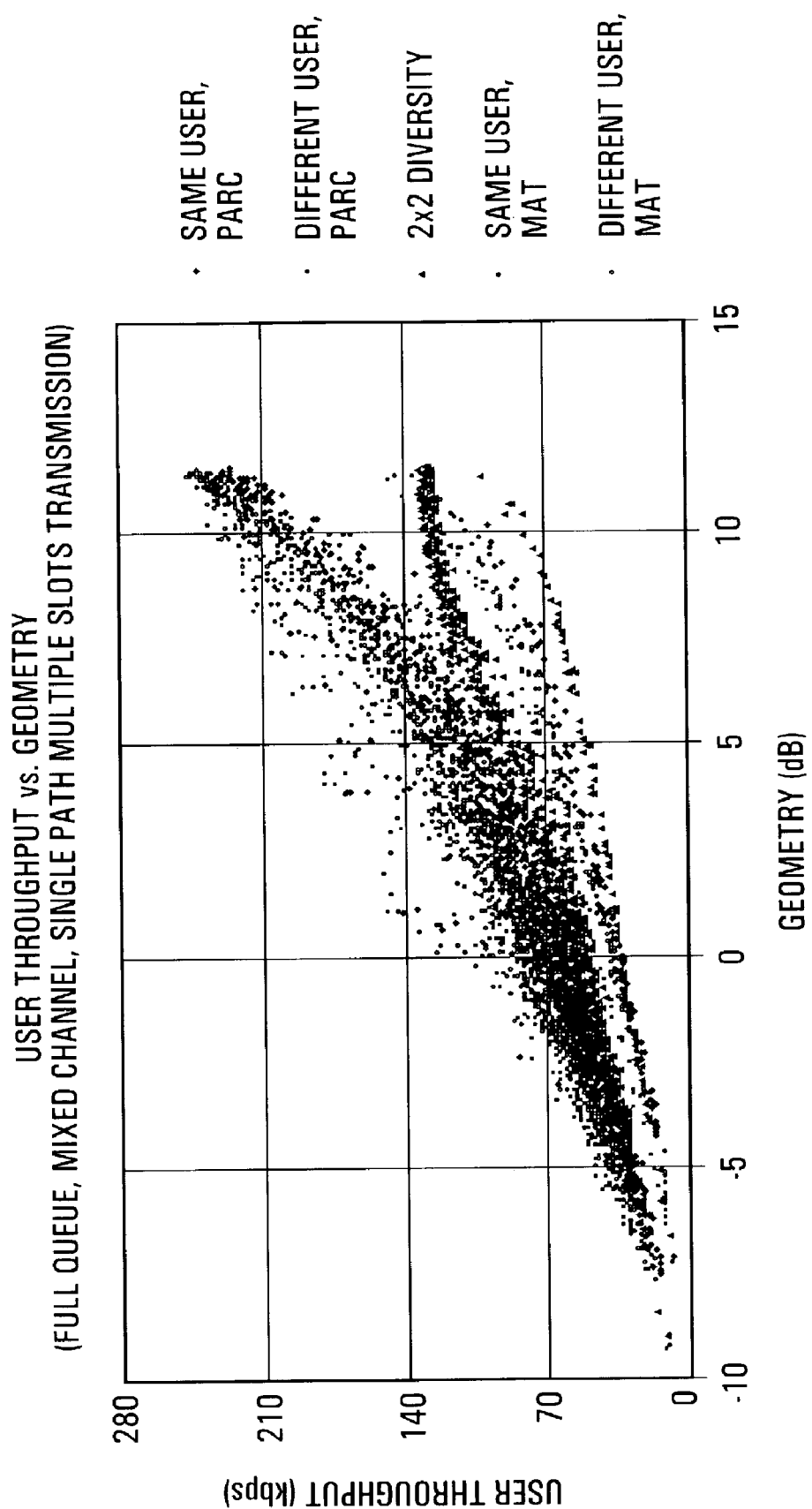

FIG. 7 shows the aggregate user throughput as a function of geometry for full queue FTP with mixed channel model. It can be found that the PARC and MAT achieve a significant user throughput gain as opposed to 2×2 transmit diversity, particularly in the region of large geometry. (Both schemes show almost the same performance.) The detailed comparison between the three schemes is listed in Table 4.

TABLE 4

Comparison between PARC, 2 × 2 diversity and proposed MAT.

| | | Sector Throughput (kbps) | Residual FER | PDCCH FER |
|---|---|---|---|---|
| PARC | Same User | 1716.7 | 8.59E−03 | 2.27E−02 |
| | Diff User | 1986.1 | 9.63E−03 | 1.71E−02 |
| 2 × 2 Diversity | — | 1412.9 | 2.59E−04 | 3.22E−03 |
| MAT | Same User | 1885.7 | 1.27E−03 | 7.84E−03 |
| | Diff User | 1921.7 | 1.20E−03 | 7.44E−03 |

Figure 8:
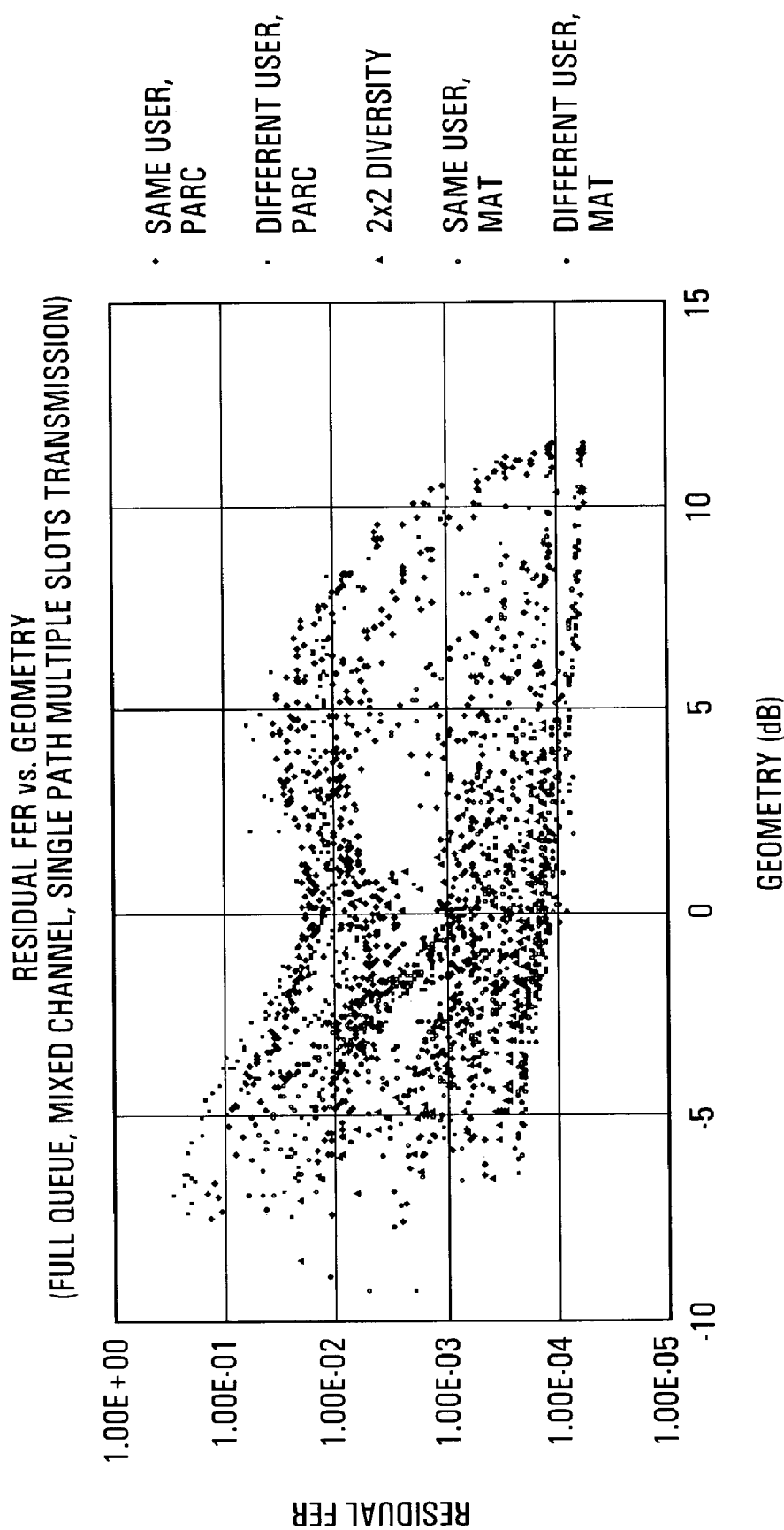

FIG. 8 shows the residual FER as a function of geometry for full queue FTP with mixed channel model. It can be found that the PARC provides the highest residual FER while 2×2 transmit diversity provides the lowest residual FER. The difference is significantly large particularly for high velocity users. Since MAT experiences the same CIR from different transmit antennas due to mix-antenna transmission, it may achieve the additional transmit diversity gain. This results in an extremely low residual FER as compared to PARC. The detailed comparison between the three schemes is listed in Table 4.

Figure 9:
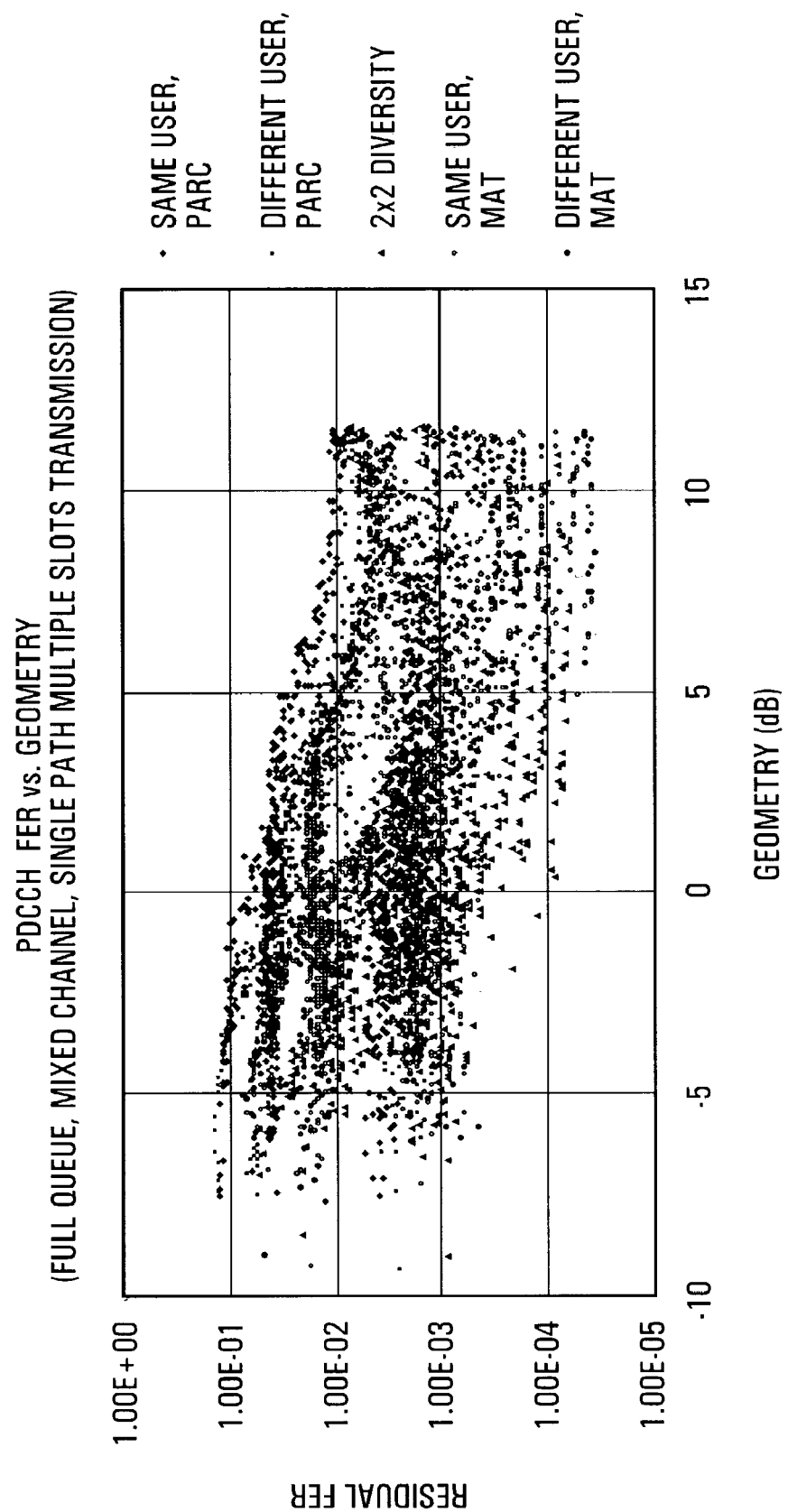

FIG. 9 shows the packet data control channel (PDCCH) FER as a function of geometry for full queue FTP with mixed channel model. It is quite similar to the residual FER we discussed above, that the PARC experiences the higher PDCCH FER while 2×2 transmit diversity and MAT experience the lower PDCCH FER. This is because the CIR variations experienced by the 2×2 transmit diversity and MAT is much smaller than that by PARC. The detailed comparison between the three schemes is listed in Table 4.

From the results as listed in Table 4, one can observe that the PARC experiences higher PDCCH FER (about 2%) while the proposed MAT experiences lower PDCCH FER (about 0.7%). To make a fair comparison, the following changes for the proposed MAT are considered:

a) Reduce the power margin for the proposed MAT as listed in Table 5 instead of Table 3:

TABLE 5

Power margin of PDCCH for MAT.

| | Channel A | Channel B | Channel C | Channel D | Channel E |
|---|---|---|---|---|---|
| 1 Slot | 1 dB | 2 dB | 4 dB | 8 dB | 0.5 dB |
| 2 Slots | 0.75 dB | 1 dB | 2 dB | 3 dB | 0.5 dB |
| 4 Slots | 0.5 dB | 0.5 dB | 1 dB | 1 dB | 0.5 dB | b) Employ the STS for PDCCH channel in case of the same-user served by two transmit antennas;

c) Reduce the number of maximum retransmissions from three to two.

By considering above changes for MAT, the simulations were performed again. The results are shown in Table 6 for comparison.

TABLE 6

Comparison between PARC, 2 × 2 diversity and NAT.

|  |  | Sector Throughput (kbps) | Residual FER | PDCCH FER |
|---|---|---|---|---|
| PARC | Same User | 1716.7 | 8.59E−03 | 2.27E−02 |
|  | Diff User | 1986.1 | 9.63E−03 | 1.71E−02 |
| 2 × 2 Diversity |  | 1412.9 | 2.59E−04 | 3.22E−03 |
| MAT (3 Retrans.) | Same User | 1914.5 | 1.38E−03 | 1.15E−02 |
|  | Diff User | 1930.9 | 1.16E−03 | 1.11E−02 |
| MAT (2 Retrans.) | Same User | 2002.3 | 7.11E−03 | 1.17E−02 |
|  | Diff User | 1990.2 | 7.72E−03 | 1.14E−02 |

From this table, it can be observed that with three maximum retransmissions the MAT achieves about 36% sector throughput gain as opposed to 2×2 transmit diversity and 12% to PARC in case of the same-user on different transmit antennas. In terms of the residual FER, MAT outperforms PARC by a factor of more than eight. To maintain the same residual FER as PARC, moreover, MAT only requires a maximum of two retransmissions.

From Table 4 and Table 6, MAT compared to schemes of 2×2 diversity and PARC can be summarized as follows:

a) MAT achieves almost the same sector throughput as PARC, but with an extremely low residual FER (by a factor of ten);

b) MAT experiences almost the same residual FER as 2×2 transmit diversity, but provides a significantly high sector throughput (more than 30%);

c) MAT not only achieves the Walsh code reuse gain as PARC, but also provides the transmit antenna diversity gain;

d) MAT requires less signaling channel (each signaling channel on each link) than PARC (two signaling channels on each link for 2×2 MIMO);

e) MAT may reduce the number of maximum retransmissions (from three to two).

In preferred embodiments, different antennas use distinct sets of Walsh codes. More generally, the same set of codes could be used for the same user on different antennas as long as the eigenvalues corresponding to two antennas are different, i.e. so long as the antennas are substantially uncorrelated.

REFERENCES

[1] 1xEV-DV Evaluation Methodology—Addendum (V6), Jul. 25, 2001.

[2] Updated Joint Physical Layer Proposal for 1xEV-DV, Jun. 11, 2001.

[3] Lucent Technologies, *MIMO Architecture Proposal for the F-PDCH*, TSG-C, WG3, Seattle, Wash., C30-20020204-051, Feb. 5, 2002.

[4] S. M. Alamouti, "A simple transmit diversity technique for wireless communications", IEEE JSAC, vol. 16, pp. 1451-58, October 1998.

[5] S. T. Chung, A. Lozano, and H. Huang, "Approaching eigenmode BLAST channel capacity using V-BLAST with rate and power feedback", VTC 2001, Atlantic City, N.J., October 2001.

Numerous modifications and variations of the present invention are possible in light of the above teachings. It is therefore to be understood that within the scope of the appended claims, the invention may be practised otherwise than as specifically described herein.

The invention claimed is:

1. A method of receiving a set of M signals using a receiver having M antennas, where M>=2, the method comprising: for each signal of the set of M signals:

Spreading each one of M subsets of modulation symbols, each of the M subsets of modulation symbols comprising at least two modulation symbols of the signal, by using a respective one of M disjoint orthogonal codes to generate a set of M corresponding spread signal components, each of the M corresponding spread signal components of the set of M corresponding spread signal components including a different one of the disjoint orthogonal codes; and for each antenna:

Generating a respective combined signal having one spread signal component of each signal by including the different one of the M disjoint orthogonal codes in each of the M corresponding spread signal components of the respective combined signal; and receiving the respective combined signal through the antenna.

2. A method according to claim 1 further comprising:

generating an average signal quality metric from the signals and transmitting the average signal quality metric back to the transmitter.

3. A receiver for receiving a set of M signals using M antennas, where M>=2, the receiver comprising: for each signal of the set of m signals:

A spreading function for spreading each one of M subsets of modulation symbols, each of the M subsets of modulation symbols comprising at least two modulation symbols of the respective signal, by using a respective one of M disjoint orthogonal codes to generate a set of M corresponding spread signal components, each of the M corresponding spread signal components of the set of M corresponding spread signal components including a different one of the M disjoint orthogonal codes;

Means for generating M combined signals, each of the M combined signals including one spread signal component of each signal, by including the different one of the M disjoint orthogonal codes in each of the M corresponding spread signal components of the M combined signals; and a respective antenna for receiving each of the M combined signals.

4. A receiver according to claim 3 further adapted to generate an average signal quality metric from the signals and transmit the average signal quality metric back to the transmitter.

5. A method of transmitting a set of M signals using a transmitter having M antennas, where M>—2, the method comprising:

for each signal of the set of M signals:

spreading each one of M subsets of modulation symbols, each of the M subsets of modulation symbols comprising at least two modulation symbols of the signal, by using a respective one of M disjoint orthogonal codes to generate a set of M corresponding spread signal components, each of the M corresponding spread signal components of the set of M corresponding spread signal components including a different one of the M disjoint orthogonal codes; and for each antenna:

generating a respective combined signal having one spread signal component of each signal by including the different one of the M disjoint orthogonal codes in each of the M corresponding spread signal components of the respective combined signal; and transmitting the respective combined signal through the antenna.

6. A method according to claim 5 wherein the M disjoint orthogonal codes are Walsh codes.

7. A method according to claim 5 wherein the modulation symbols of each signal are generated by:

encoding a raw information stream to generate corresponding encoded packets; and modulating the corresponding encoded packets to generate the modulation symbols of the signal.

8. A method according to claim 7 further comprising, for each signal:

receiving respective channel quality information for the signal over a reverse link control channel, the respective channel quality information being generated by a receiver of the signal; and adaptively controlling the steps of encoding the raw information stream and modulating the encoded packets as a function of the received respective channel quality information.

9. A method according to claim 8 wherein the respective channel quality information for the signal comprises an average carrier to interference ratio experienced across multiple antennas at a receiver of the signal.

10. A method according to claim 5 wherein the M signals of the set of M signals belong to at least one user, the method further comprising:

for each user, transmitting a respective forward link control channel identifying one or more of a number of slots, a transmission rate, a code rate/type and a modulation type.

11. A transmitter for transmitting a set of M signals using M antennas, where M>=2, the transmitter comprising:

for each signal of the set of M signals:

a spreading function for spreading each one of M subsets of modulation symbols, each of the M subsets of modulation symbols comprising at least two modulation symbols of the respective signal, by using a respective one of M disjoint orthogonal codes to generate a set of M corresponding spread signal components, each of the M corresponding spread signal components of the set of M corresponding spread signal components including a different one of the M disjoint orthogonal codes;

means for generating M combined signals, each of the M combined signals including one spread signal component of each signal, by including the different one of the M disjoint orthogonal codes in each of the M corresponding spread signal components of the M combined signals; and a respective antenna for transmitting each of the M combined signals.

12. A transmitter according to claim 11 wherein the M disjoint orthogonal codes are Walsh codes.

13. A transmitter according to claim 11 further comprising, for each signal:

an encoder for encoding a raw information stream to generate corresponding encoded packets of the signal;

a modulator for modulating the corresponding encoded packets to generate the modulation symbols of the signal.

14. A transmitter according to claim 13 further comprising, for each signal:

an input for receiving respective channel quality information for the signal over a reverse link control channel, the respective channel quality information being generated by a receiver of the signal; and an adaptive controller for adaptively controlling the encoder and the modulator as a function of the received respective channel quality information.

15. A transmitter according to claim 11 wherein the M combined signals belong to at least one user, the transmitter being further configured to transmit a respective forward link control channel for each user, each respective forward link control channel identifying one or more of a number of slots, a transmission rate, a code rate/type and a modulation type.

\* \* \* \* \*